Jan. 12, 1971 A. E. AKERS ET AL 3,555,534
PROXIMITY DETECTOR WITH A SENSING PROBE
Filed March 10, 1967 3 Sheets-Sheet 1
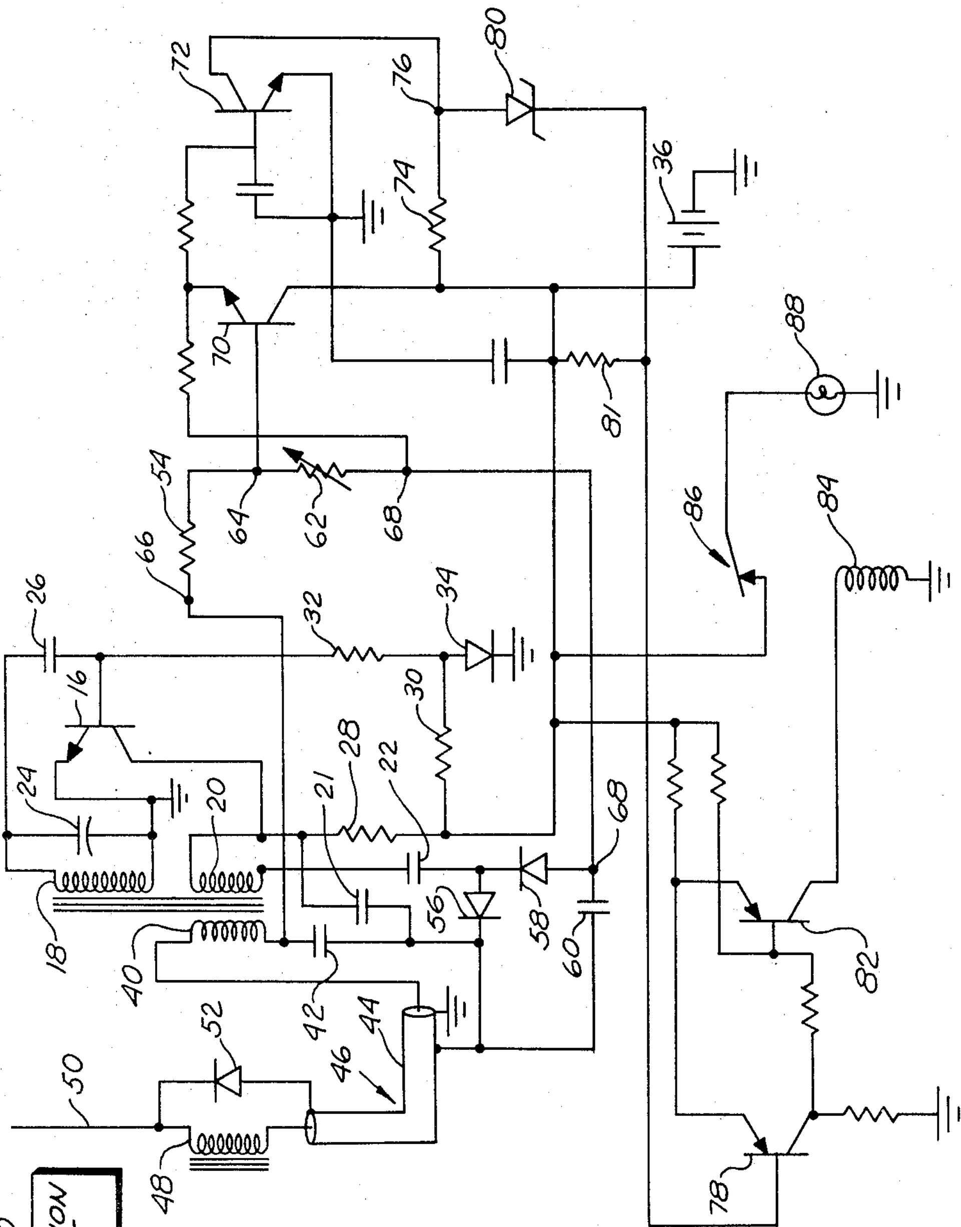
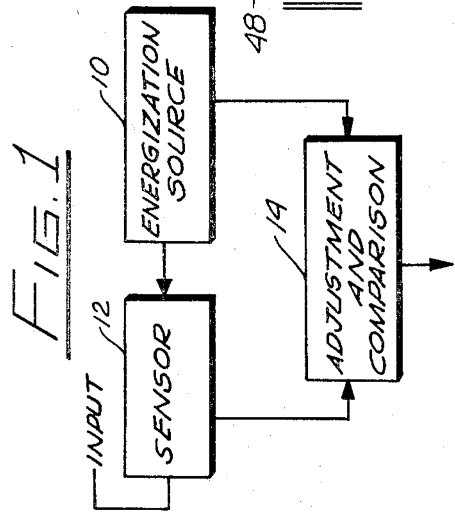
INVENTORS.
ROBERT W. SCHONLE
ARTIE E. AKERS
BY
Allan Rothenberg
ATTORNEY PROXIMITY DETECTOR WITH A SENSING PROBE
Filed March 10, 1967 
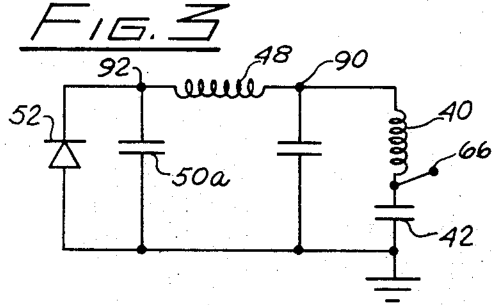
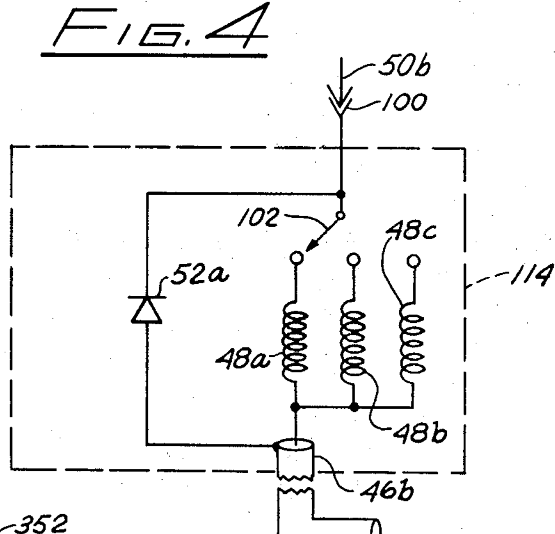
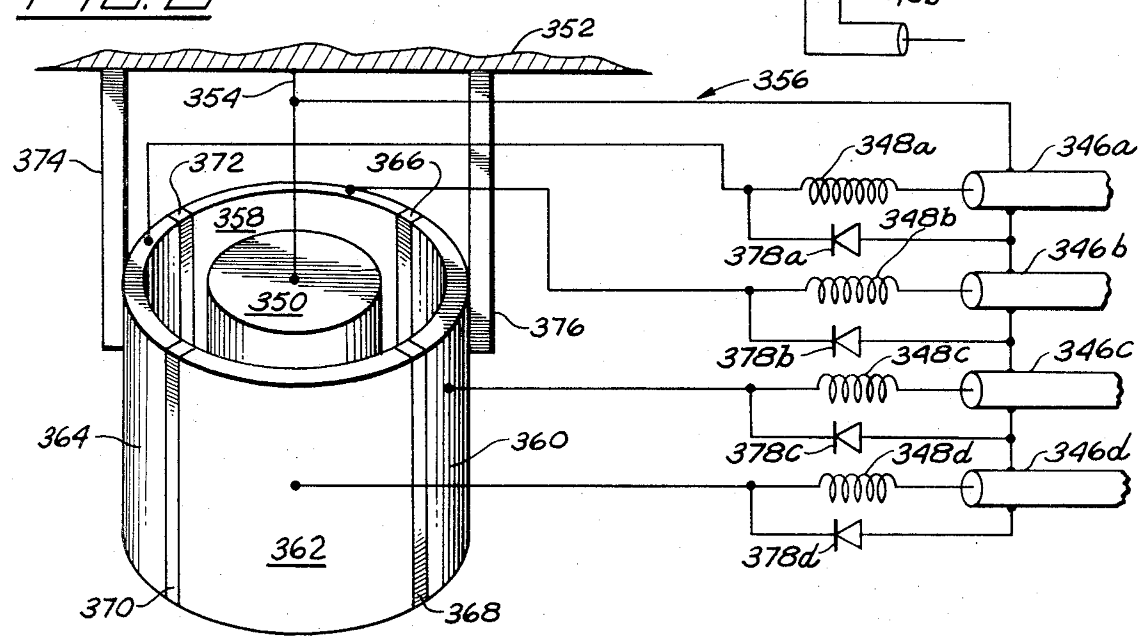
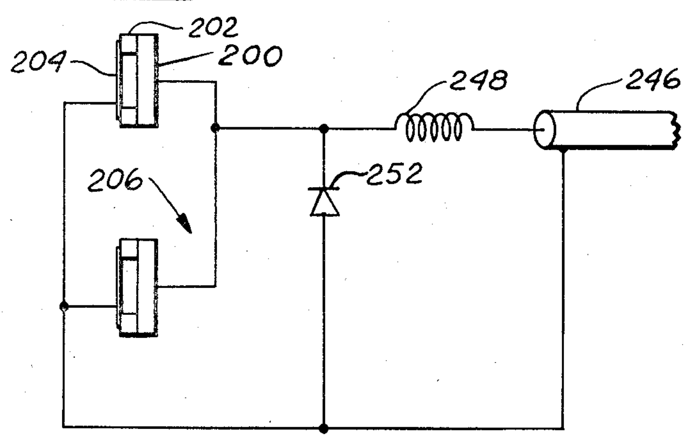
INVENTORS.
ROBERT W. SCHONLE
ARTIE E. AKERS
BY
Allan Ratner[illegible]
ATTORNEY

PROXIMITY DETECTOR WITH A SENSING PROBE

Filed March 10, 1967 3 Sheets-Sheet 3

INVENTORS.
ROBERT W. SCHONLE
ARTIE E. AKERS
BY
Allan Rothenberg
ATTORNEY

United States Patent Office 3,555,534

Patented Jan. 12, 1971

3,555,534

PROXIMITY DETECTOR WITH A SENSING PROBE

Artie E. Akers, San Diego, and Robert W. Schonle, Westminster, Calif., assignors to North American Rockwell Corporation, a corporation of Delaware Filed Mar. 10, 1967, Ser. No. 622,240

Int. Cl. G08b *13/26*

U.S. Cl. 340—258 1 Claim

ABSTRACT OF THE DISCLOSURE

A proximity detector having preferably a single capacitive sensing probe in which the capacitance thereof changes with movement of matter within the capacitive field to change the voltage of the oscillating current in the probe. Since this voltage is also dependent on the voltage of the energizing source, means are provided to observe only relative changes between the voltages to produce an alarm when this phenomenon occurs.

In reactive person or object alarm systems the connecting line between a remote sensor and the driving oscillator has been a subject of distortion and noise adversely effecting the sensitivity threshold. These connecting lines have included distributed capacity which in part masks the reactance of the sensor itself or masks the reactance of that portion of the sensor which is in the field to be guarded. Also, such prior sensing systems have required a good ground connection or have required existence of a conductive earth in the vicinity of the sensor. Accordingly, in situations where such a ground is not available as, for example, in areas that are exceedingly dry, such apparatus is inoperable. Such sensors are also subject to spurious alarms due to fluctuation in the driving oscillator which may cause signals erroneously indicating the existence of a condition to be sensed.

Accordingly it is an object of the present invention to provide an improved sensing system that minimizes the above stated disadvantages and yet achieves a high degree of sensitivity in a wide variety of conditions.

In carrying out the invention in accordance with a preferred embodiment thereof, there is provided condition responsive apparatus comprising an oscillatory source of electrical energy, a sensor including means responsive to a condition to be sensed and which is energized by the electrical energy source, and a comparison means that is responsive both to the oscillatory source and to the modified output of the sensor for providing an output condition signal that is indicative of the difference between the output of the sensor and the output of the source. The comparison means includes an adjustment for effecting relative adjustment of the two input signals thereto to cause them to be substantially equal at quiescent condition of the apparatus whereby false alarms due to oscillator amplitude fluctuations are minimized. More particularly the oscillator is tuned nearly to the resonant frequency of a series resonant sensing circuit of which the reactance is varied in response to a condition to be sensed. The oscillator is loosely coupled through a low impedance coupling to a low impedance coaxial cable that drives the resonant sensing circuit at a frequency just off its resonance. A novel means is provided for deriving an output from the sensing circuit in the form of a rectifier coupled across one of the reactive members of the sensing circuit whereby a fluctuating D-C signal is fed back through the center conductor of the coaxial cable for comparison with an adjusted rectified voltage output of the driving oscillator. When the difference between the compared signals, the signal from the sensor and the signal from the oscillator, departs from its quiescent condition, a suitable alarm is triggered to indicate the occurence of the sensed condition.

Other objects and many attendant advantages of the invention will become apparent from the following detailed description when taken in connection with the accompanying drawings in which:

FIG. 1 is a block diagram of basic components of a sensing system of this invention;

FIG. 2 is a detailed circuit diagram of a preferred embodiment of the system;

FIG. 3 is a circuit illustrating operation of the sensor and sensor readout circuit; and FIGS. 4, 5, 6, 7 and 8 illustrate modified forms of sensor arrangement.

In the drawings like reference numerals refer to like parts.

Figure 7:
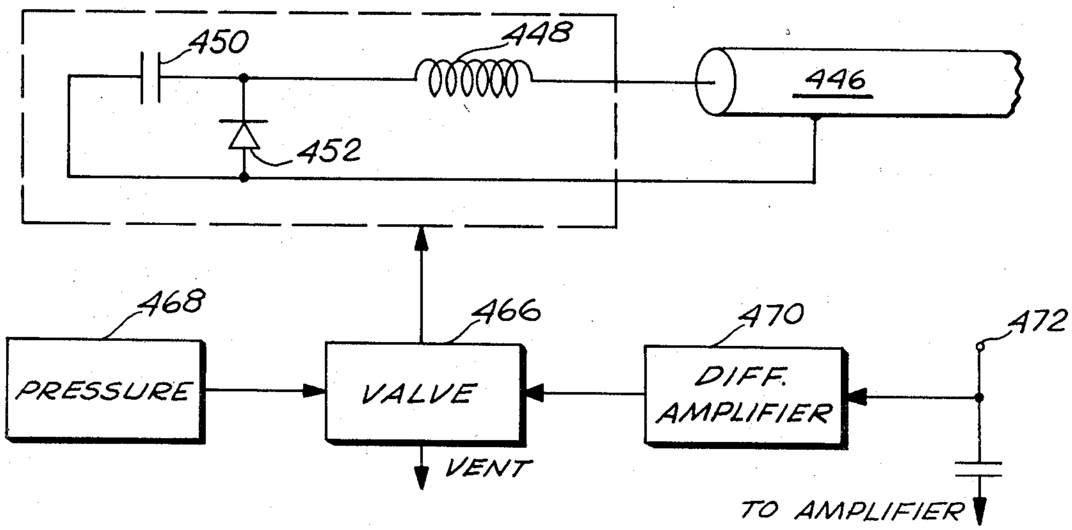

As illustrated in FIG. 1 a source of energization 10 is connected to drive a sensor 12 which is subject to an information input and provides a sensor output that is a function of the energizing signal as modified by the input information applied thereto. The output from the sensor and an output signal from the energizing source 10 are applied as two inputs to an adjustment and comparison circuit 14 which is normally adjusted for quiescent condition of the sensor input so that the comparison circuit output is at or substantially at zero (—0.2 to 0.4 v.) even though both the energizing source and the signal in the sensor may have significant magnitudes. With such an adjustment and comparison arrangement there is achieved high sensitivity while minimizing the possibility of false alarms or false sensing signals that may be caused by fluctuation in amplitude of the energization source, such as are due to temperature variations, line voltage fluctuations, parameter changes or other environmental factors that will affect such a source.

Referring now to FIG. 2, there is shown an embodiment wherein the energy source is a modified Hartley oscillator comprising a transistor 16, a pair of inductances 18 and 20, capacitors 21, 24 and 26, resistors 28, 30 and 32, and a grounded bias diode 34, all connected as illustrated. Capacitor 22 is a coupling device to voltage rectifier-doublers to be described below. As is well known, the frequency of such an oscillator, which in this case may vary from 500 kilocycles to 1500 kilocycles, normally at 700 kilocycles, is determined by the values of the various distributed inductance and capacitance of the circuit and circuit components. It will be readily understood that operation at lower and at much higher frequencies is feasible and models have been operated at 7.5 megacycles per second.

A positive potential is supplied for the system from a direct current source 36 and is fed to the collector of transistor 16 via resistor 28.

The oscillator output is loosely coupled by inductance 20 to a sensor driving coil 40 which comprises the secondary of a transformer having both coils 18 and 20 wound thereon. In an exemplary embodiment the turns ratio of coil 20 to coil 40 is about 40:7 and the coefficient of coupling between the coils is about 0.75. One end of coil 40 is connected via capacitor 42 to a chassis ground and the other end is connected to the center conductor 44 of a low impedance coaxial cable 46 that has the shield or outer conductor thereof connected to the chassis ground. The coaxial cable 46 has a low impedance that matches the relatively low impedance of sensor driving coil 40 to provide optimum power transfer.

The low impedance coaxial cable drives a low impedance sensing circuit comprising a sensing coil 48 and a capacitative element 50 which is an antenna or insulated electrical conductor that is positioned within the field in which intrusion or removal of a body or object is to be detected. The coil 48 and capacitative element are designed to form a series resonant circuit at the operating frequency.

A rectifier in the form of a diode 52 is connected at one side to the junction between coil 48 and the capacitative element 50 of the series L–C sensor circuit and is connected at the other side thereof to the shield of the coaxial cable that is in turn connected to chassis ground.

The oscillator is normally tuned by manual adjustment of capacitor 24 to a frequency that is slightly displaced from the resonant frequency of the series resonant circuit formed by capacitative sensor element 50 and inductive sensor element 48. When an object approaches element 50 the dielectric field between the element and ground is varied, changing the capacitative reactance of the series resonant circuit, decreasing the current in this circuit and thereby decreasing the voltage across coil 4, and in turn this voltage is half-wave rectified by diode 52. This fluctuating D-C voltage, which is positive with respect to chassis ground for the diode polarity illustrated, is fed back via coil 48, the center conductor of the coaxial cable, through coil 40 and thence to one resistor 54 to the adjustment and comparison circuit 14, indicated in FIG. 1. Capacitor 42 acts as a D-C blocking capacitor and also smooths the fluctuating D-C voltage that is applied to the resistor 54.

It will be readily appreciated that the illustrated arrangement may be utilized to sense either the entrance of a body or object into the field adjacent the sensing antenna element 50 or the removal of a body or object from such field. For sensing entry of a body into the field, the oscillator tuning capacitor 24 is varied to choose an oscillator frequency that is on one side (low) of the resonant frequency of the series L–C circuit formed by coil 48 and sensor element 50. In this situation an intrusion into an area adjacent the field of the sensor element 50 will effectively shift (lower) the resonant frequency of the sensor and increase the difference between such resonant frequency and the oscillator driving frequency whereby there is a decrease in the sensor voltage.

For use to detect departure of an object or person from the field adjacent the sensor 50, the oscillator is tuned to a frequency that is on the other (high) side of the resonant frequency of the series resonant circuit; that is, the sense of the difference between the tuned oscillator frequency and the resonant frequency of the sensor circuit shifts in the other direction but again increasing the difference between such resonant frequency and the oscillator tuned frequency whereby the voltage in the sensor is again decreased to indicate the condition that is to be detected.

In order to minimize false alarms, spurious operation due to the undesired or haphazard fluctuation of the driver oscillator, the rectified sensor voltage is fed back for comparison with an adjusted voltage derived directly from the oscillator. This oscillator comparison voltage is taken from the collector of the transistor 16 and fed through the capacitor 22 to a voltage rectifier-doubler circuit comprising diodes 56 and 58 of which diode 56 is connected between capacitor 22 and chassis ground and diode 58 is connected between capacitor 22 and chassis ground via a smoothing capacitor 60. The rectified and smoothed oscillator voltage appearing at point 68, the junction of capacitor 60 and diode 58 is fed through a variable resistor 62 which comprises the other half of the comparison circuit. Thus at the junction of comparator resistors 54 and 62, at point 64, there appears a voltage which is substantially zero at quiescent condition. For example in one specific embodiment the circuit is constructed and operated to provide a quiescent value at point 64 of +0.4 volt, which may be varied by adjustment of resistor 62 between quiescent values of +0.8 and −1.5 volts.

In practice, in one embodiment, the operating circuit parameters are so chosen that the voltage in the oscillator circuit across coil 20 is on the order of 100 volts peak to peak and the voltage across driver coil 40 is on the order of 17.5 volts peak to peak. The half-wave rectified voltage across sensor coil 48 in such a situation is roughly 40 volts and the voltage at point 66, the end of resistor 54 that is remote from point 64, is about 31 volts positive with respect to chassis ground under quiescent conditions. The polarities of rectifying diodes 56 and 58 are so chosen and resistor 62 is adjusted so that the voltage at point 68, the junction of diode 58 and capacitor 60, is approximately negative 31 volts with respect to chassis ground. Accordingly under quiescent condition the voltage at point 64, the output of the detecting circuit after comparison and substantial equalization, is normally positive 0.4 volt with respect to ground.

A variation from the quiescent condition at the sensor element 50 decreases the voltage in the sensor, decreases the voltage rectified by the rectifier 52 and decreases the voltage at point 66 whereby the voltage at point 64 is decreased from its quiescent value of positive 0.4 volt. This decrease in voltage is fed to the base of normally conducting emitter follower transistor 70 which accordingly is driven to cut-off. The decrease in conduction of transistor 70 is resistance coupled to effect a decrease in the current to the base of a second normally conducting transistor 72 which likewise is cut-off.

Normally, in quiescent condition, the positive supply 36 feeds a D-C voltage through a resistor 74 to the collector of the transistor 72. With the latter conducting relatively heavily, the voltage at point 76, the transistor collector, is relatively low. Point 76 is connected to the base of a first transistor 78 of a Schmidt trigger via a Zener diode 80. The other side of diode 80 is connected to positive supply by a resistor 81. Accordingly, when conduction of transistor 72 decreases, the voltage at point 76 increases to fire the Zener diode 80 and cut off the normally conducting transistor 78. When the latter is cut off, a second transistor of the Schmidt trigger, transistor 82, which is normally cut off, now conducts to energize a relay coil 84 and operate contacts 86 to connect an alarm circuit such as light 88, to the positive source of potential 36.

It will be seen that the use of the comparison circuit, including resistors 54 and 62, provides significantly increased sensitivity of the detection system and, further, eliminates false alarms that may be caused by spurious amplitude fluctuations of the energizing oscillator. The comparison circuit enables the use of relatively high voltages, on the order of 40 to 50 volts in the sensor circuit, yet permits detection of voltage changes on the order of one-tenth volt or less. In operation of the comparison circuit in order to afford maximum compensation for spurious oscillator amplitude fluctuation, it is necessary to include an adjustment such as adjustable resistor 62 to enable, at quiescent condition, a substantial equalization of the sensor voltage with the comparison voltage obtained from the oscillator. With the two voltages made substantially equal, as described above, at quiescent condition, variations in oscillator amplitude appear with substantially equal magnitude as variations in the sensor voltage magnitude. Since the two are of opposite polarity, the effects of most such fluctuations are greatly minimized.

Illustrated in FIG. 3 is a circuit that is useful in explaining operation of the low impedance coaxial cable and rectification employed with the sensor circuit specifically illustrated in FIG. 2. In FIG. 3 elements that are identical with similar elements in FIG. 2 are designated by the same reference numeral as, for example, coil 40, capacitor 42, sensor coil 40 and diode 52. Shown in FIG. 3 as capacitance **46*a* is the distributed capacitance of the coaxial cable 46, specifically the capacitance between the center conductor of the cable and its shield or outer conductor. Shown as capacitor 50*a* in FIG. 3 is the capacitance between sensor element 50, the sensor antenna, and ground, which may be earth or a second chassis grounded conductor or counter poise as described in connection with FIG. 4, below. Capacitance 50*a* is the capacitance that is varied by the condition to be sensed for the particular embodiment illustrated in FIG. 2. As previously indicated the oscillator is tuned to be substantially at, though slightly displaced from, the resonant frequency of the series resonant circuit formed by elements 48 and 50*a*. A low impedance output from the oscillator coil 20 of FIG. 2 is coupled with the low impedance coil 40 and, through the matching low impedance coaxial cable having the distributed capacity 46*a*, to point 90 which is the low impedance input to the series resonant circuit 48, 50*a***.

In accordance with a significant aspect of the described invention, the sensor is driven at a low impedance point through a low impedance connecting device from a low impedance driving coil and the signal in the sensor is derived from a sensor at a high impedance point thereof, namely point 92. The voltage across one of the sensor elements, which is voltage taken at high impedance point 92, is rectified by a rectifier 52 and then fed back as a D-C level through the low D-C impedance coils 48 and 40, to point 66 from whence the rectified voltage is fed to the comparison circuit including resistor 54.

With this arrangement the length of cable 46 having the distributed capacitance **46*a* does not form a significant operating portion of the sensing circuitry. Where a sensor is to be remote from the alarm circuitry a significant length of connecting cable, such as 46, is required. Obviously the effects of the reactance of such a connecting cable may be so great as to substantially mask effects of a disturbance that is to be detected. For example, the value of capacitance 50*a* may be on the order of 200 picofarads and the capacitance of the low impedance coaxial cable may be on the order of 13 picofarads per foot. Accordingly it will be seen that any significant length of connecting cable will provide a capacitance that is large when compared with the capacitance whose variation is to be the measure of the condition to be sensed. In accordance with a feature of this invention the sensing signal, the signal that is actually detected and fed back for comparison in the comparison network, is the signal developed across only the sensing capacitance 50*a* and is substantially free of the influence of the relatively large capacitance of the connecting cable 46**. For this reason an exemplary operating embodiment uses a coaxial connecting cable of seven hundred and fifty feet while maintaining good sensitivity.

It will be readily appreciated that means other than the indicated rectifier may be employed to directly sense the voltage across the one sensing element of the L–C series resonant sensor. Such other direct means, which might include directly coupling a pair of output lines to opposite sides of the capacitance, would require additional wiring and might possibly introduce additional unwanted capacitance. On the other hand, with the arrangement illustrated, employing a single diode connected as indicated, the center conductor of the connecting cable 46 itself comprises the sensor output line and still eliminates the loading effect of the cable capacitance **46*a*. The outer conductor of the cable acts as a counter poise or ground plane and enables the sensor to be located at a point remote from the operator who must adjust the oscillator. This avoids any effect of the operator on the sensor capacitance. Further, if the cable 46** is broken, an alarm signal is generated.

As suggested in FIG. 4 the sensor may take a number of different forms and in an alternative embodiment may include a plurality of selectively operable sensor coils **48*a*, 48*b* and 48*c* selectively connected to an antenna connecting jack 100 by means of a selector switch 102. In this arrangement the diode 52*a* is connected between the switch arm 102 and the outer grounded conductor of the coaxial cable 46*b* which is connected to other circuitry illustrated in FIG. 2 in the same manner as the corresponding cable 46**.

In desert areas where earth ground is not available or in situations where earth ground is not available for other reasons, there is inherently provided a chassis grounded or counterpoise element by virtue of the outer conductor or shield of the coaxial cable 46 which is adjacent to the antenna element **50*b* whereby the sensor is operative to detect a change in the dielectric field between the element 50*b* and the cable shield. Also illustrated in FIG. 4, indicated by dotted line 114, is the practical arrangement of encapsulating the entire sensor and providing a jack for connection of element 50*b* and also a jack for connecting the coaxial cable 46**.

The selective use of coils of a different inductance is desirable to allow flexibility in the use of capacitive sensing elements **50*b* of considerably different length. As previously indicated the capacitative sensor element 50*b* and the inductive sensor element 48*a*, 48*b*, or 48*c* provide a series resonant circuit. With variation in length of capacitative element 50*b*** it will be necessary to vary to some extent, the inductance of the coil in order to provide a resonant frequency within the tunable range of the oscillator. It will be readily appreciated that rather than provide different individually selectable coils, a single coil having selectable taps may be employed.

The specific embodiment described in connection with FIGS. 2, 3, and 4 concerns a security system which is operable to detect intrusion or removal of a body or object. It will be readily appreciated that the principles of the invention are equally applicable to other capacitative-inductive sensors where the condition to be sensed is other than intrusion or removal of a body into or from a field of the antenna. Any condition that will modify either the inductance of coil 48 of FIG. 3 or which will modify the capacitance of capacitor **50*a* of FIG. 3, can be sensed with the illustrated arrangement. The described sensing apparatus, with its adjustable comparison and readout isolated from oscillator fluctuations, is applicable to transducers having either a variable inductance or variable capacitance, to position feedback servomechanisms, to electromechanical counters, to liquid level sensors, to motion sensors, burglar alarms, seismometers, or to metal detectors. For use as a motion sensor or position feedback, either the position of the core of coil 48 of FIG. 2 may be caused to move according to the position or motion to be sensed or one of the plates of the capacitor 50*a* of the sensor may be caused to move according to such motion, pressure, or other condition to be sensed. For detection of magnetic materials it will be readily appreciated that any such material placed in proximity to the coil 48 will vary its inductance and thus cause a change in the sensor output. In each of these arrangements there is provided an improved operation by virtue of the adjustable comparison circuit that enables use of relatively high voltages compared at substantial equality to provide an output signal at point 64** which is substantially zero at quiescent condition and which is substantially free of fluctuations due to spurious variations of oscillator amplitude.

Illustrated in FIG. 5 is a modified form of sensor particularly adapted for use as a microphone. In this arrangement a coaxial cable 246 is connected to circuitry arranged and adjusted as described in connection with FIG. 2. The sensor end of the center conductor of the coaxial cable is connected to a sensor coil 248 which has one end connected to a sensor diode 252. The diode is connected at its other side to the coaxial cable shield. In this arrangement the capacitance is provided by a relatively rigid plate 200 to which is rigidly secured an electrically insulative member 202 that securely mounts the periphery of a flexible capacitive plate or diaphragm 204. Plate 200 is connected to the junction of coil 248 and diode 252 and the flexible diaphragm 204 is connected to the chassis ground by means of its connection with the outer conductor of cable 246.

If desired, one or more additional, similar capacitive microphones, such as that indicated at 206, may be connected in parallel with the microphone 200, 204 to provide increased directivity. In an operating embodiment, a plurality of such capacitive microphones, each having a normal capacitance of 62 picofarads, there has been achieved a sensitivity of plus or minus 0.0015 picofarads for each microphone.

For use as a physical motion or vibration sensing device as, for example, a seismometer, the sensor may be arranged as indicated in FIG. 6 wherein the coaxial cable 346 and sensor coil 348 are arranged and connected to an oscillator and comparison circuit substantially as described in connection with FIG. 2. In this situation the capacitance of the series-resonant sensor circuit is provided by means of a massive, electrically conductive cylinder 350 that is suspended from a support 352. The support may be an overhead table or base mounted on the ground for response to vibration of the ground. The massive cylinder may be a solid nonconductive slug having a conductive coating and is freely suspended from the support 352 by means of a string or thin cable 354 which may conveniently comprise an electrical connection to the conductive element 350. This conductive cable is connected by means of lead 356 to the outer conductor or chassis ground provided by cable 346.

The second plate of the capacitor of the sensor in the arrangement of FIG. 6 is provided by one of a plurality of rigidly interconnected conductive cylindrical sectors 358, 360, 362, 364 rigidly connected to, but insulated from each other, by insulation means 366, 368, 370, 372. The sectors 358 through 364 form a rigid hollow cylinder that is fixedly mounted to the support 352 by rigid support bars 374, 376 and which surrounds the freely suspended inner conductive element 350. Each sector of the outer cylinder forms the second plate of a capacitor to provide four separate capacitors, each of which has a common center plate provided by the element 350. Each capacitor is connected to form the capacitive element of the series-resonant capacitive inductive circuit as previously described in connection with FIG. 2. Each of the sectors 358, 360, 362 and 364 is connected as indicated to an associated assembly of sensor coil and sensor coaxial cable 348, 346, **348*b*, 346*b*, 348*c*, 346*c*, 348*d*, 346*c* and all outer conductors of the cables are connected together and to the lead 356. For each sensor a separate diode 378*a*, 378*b*, 378*c* and 378*d*** is connected between one of the capacitor plates and the chassis ground, across the associated coil as indicated in FIG. 6.

Accordingly the described arrangement provides four substantially independent sensor arrangements all as previously described except for the fact that one plate of the capacitive element, that provided by the element 350, is common to all four sensing capacitors. With this arrangement a vibration that is experienced by the support 352 will effect a motion of the suspended capacitor plate 350 relative to the fixed plates 358, 360, 362 and 364, decreasing one or more of the capacitances and increasing others. A suitable sensing circuitry may be arranged to compare magnitudes and sense of changes of the four sensors to thus provide indication of the existence of a vibration and the direction if desired.

It will be readily appreciated that the outer conductive cylinder sectors 358 through 364 are preferably arranged to be vertical. If desired this may be facilitated by mounting the outer capacitive cylinder in a gimbal arrangement to enable it to automatically assume a vertical position.

Figure 8:
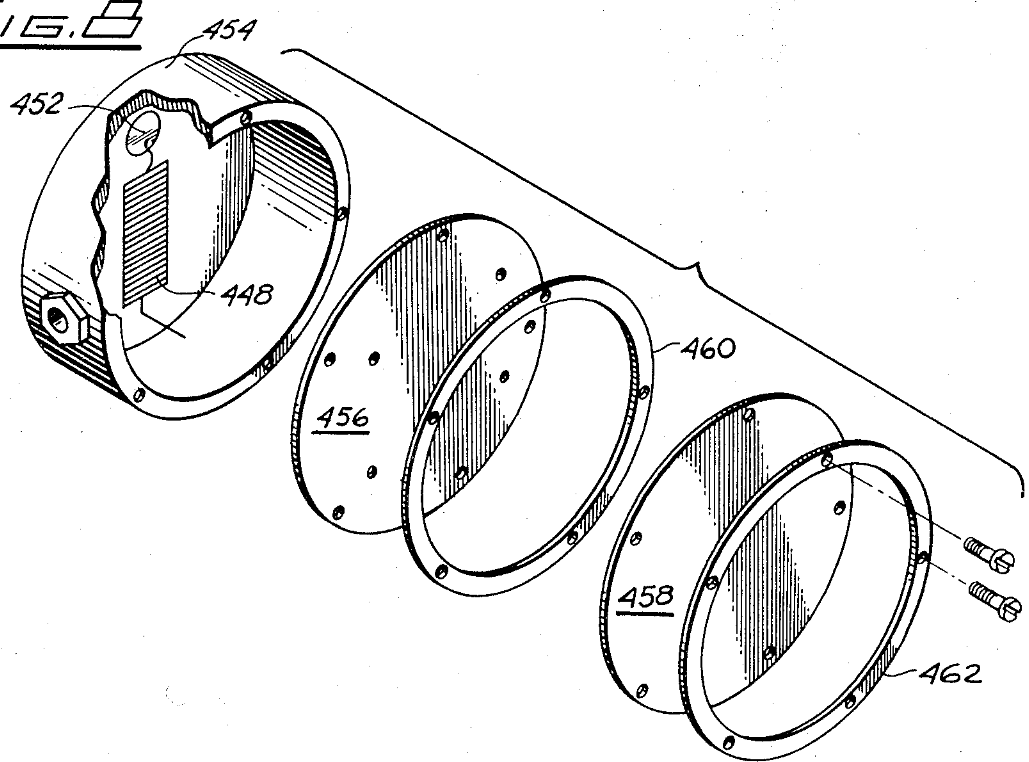

Illustrated in FIG. 7 is a block diagram of an embodiment of the described invention particularly adapted for use as an underwater microphone or sonor detector which has a provision for automatic adjustment for depth or long term, quasi-steady-state pressure variations. In this arrangement the sensor includes a sensor coil 448 connected with a sensor capacitor 450, sensor diode 452, and a coaxial cable 446, all arranged and electrically connected with driving and detecting circuitry as described in connection with FIG. 2. In this embodiment, as illustrated in FIG. 8, the sensor is physically provided with a cup shaped outer case 454 having mounted therein the coil 448 and diode 452. An apertured electrically conductive and relatively rigid inner plate 456 is fixedly secured to the periphery of the case 454 and a second capacitive element in the form of a flexible outer diaphragm 458 is secured thereto and insulated therefrom by means of a Teflon gasket 460. The assembly of plate 456, diaphragm 458 and gasket 460 is secured and sealed to the case 452 by an outer annular clamp 462 of relatively rigid material. Case 454 has a pressure inlet 464 and suitable electrical connections are provided for connection of the diode and capacitor plates 456 and 458 to the connecting coaxial cable as indicated in FIG. 7. Coil 448 is connected to the second capacitative plate 458 by an insulated lead which extends through one of the apertures in plate 456.

In this arrangement plates 456 and 458 form the variable sensing capacitance with plate 458 flexing in response to audio frequency pressure variations to be detected. This varies the capacitance of the sensor, providing an audio signal that is detected as described in connection with the embodiment of FIG. 2. With the arrangement illustrated in FIGS. 7 and 8, changes in water pressure or long term pressure variations will cause a relatively steady state deflection of the sensing capacitor plate 458 to automatically compensate for such steady state variations and to automatically adjust for varying pressure. The pressure within the sealed microphone case 454 is adjustable by means of a valve 466 that supplies gas under pressure from a high pressure gas reservoir 468 to the pressure inlet 464 of the microphone case. Valve 466 is controlled by an electrical signal from a differential amplifier 470 that provides a signal of one polarity or the other in accordance with the signal provided at the output of the sensor capacitor appearing at point 472 of FIG. 7. This terminal 472 is analogous to point 64 of FIG. 2 at which point appears a signal that is sent to the audio amplifier. Thus, if the steady-state pressure should increase, a change in capacitance is detected and the signal appearing at terminal 472 is fed to the differential amplifier 470 to operate valve 466 in a sense to provide air pressure increment or pressure release to or from the interior of the sealed microphone. The response of the differential amplifier is such that it is relatively insensitive to the audio frequency signals that appear at terminal 472.

It will be seen that applicants have described a number of embodiments of condition responsive apparatus that has great sensitivity, is free of variations due to environmental conditions and due to oscillator fluctuations and which employs a novel and improved means of readout of the sensor signal.

What is claimed is:

1. Condition responsive apparatus comprising:

an oscillator to provide radio frequency energy at a fixed frequency and including a low impedance energizing coil, a sensor disposed to be energized by the source and including a series connected inductive and capacitive network to produce a resonant circuit tuned to a frequency displaced from said fixed frequency, a low impedance coaxial cable coupling radio frequency energy from said coil to said sensor, a first rectifier having one side connected to the junction of said inductive and capacitative members and the other side connected to the outer shield of said cable, to provide an electrical signal indicative of the energy level in said sensor, a sensor driver coil inductively coupled with said energizing coil and connected at one side thereof to the center conductor of said cable, a D-C blocking capacitor connected between the outer shield of said cable and the other side of said driver coil, a second rectifier coupled with the oscillator and poled to provide a source output signal indicative of the energy level produced by said oscillator and having a polarity opposite that provided by said first rectifier, and comparison means comprising a first resistor connected between an output terminal and the junction of said sensor driver coil and said capacitor, a second resistor connected between the second rectifier and said output terminal, said rectifiers being poled so that current flows in a loop formed by said sensor coil, said inductive member, said first rectifier, said first and second resistors, and said first and second rectifiers, and means for adjusting one of said resistors to cause the voltage at said output terminal to be substantially zero at quiescent condition.

References Cited

UNITED STATES PATENTS 2,178,471 10/1939 Bruin ............ 324—61UX
2,711,590 6/1955 Wilcox .............. 33—206

2,979,706 4/1961 Simon et al. ....... 340—258X
3,230,519 1/1966 Metz et al. .......... 340—258
3,372,333 3/1968 Esch ............. 324—61UX
3,109,893 11/1963 Burns ............. 340—258X
3,195,043 7/1965 Burig et al. ...... 340—258UX
3,234,539 2/1966 Bagno .............. 340—258
3,237,191 2/1966 Bojko ........... 340—258UX THOMAS B. HABECKER, Primary Examiner D. L. TRAFTON, Assistant Examiner U.S. Cl. X.R.

307—116; 317—146; 324—61, 67; 340—262, 282